United States Patent
Ozaki et al.

(10) Patent No.: US 11,161,982 B2
(45) Date of Patent: Nov. 2, 2021

(54) FILM FORMING COMPOSITION AND FILM FORMING METHOD USING THE SAME

(71) Applicant: Merck Patent GmbH, Darmstadt (DE)

(72) Inventors: Yuki Ozaki, Kakegawa (JP); Go Noya, Kakegawa (JP); Masakazu Kobayashi, Kakegawa (JP)

(73) Assignee: Merck Patent GmbH, Darmstadt (DE)

(*) Notice: Subject to any disclaimer, the term of this patent is extended or adjusted under 35 U.S.C. 154(b) by 131 days.

(21) Appl. No.: 16/500,176

(22) PCT Filed: Apr. 3, 2018

(86) PCT No.: PCT/EP2018/058381
§ 371 (c)(1),
(2) Date: Oct. 2, 2019

(87) PCT Pub. No.: WO2018/185042
PCT Pub. Date: Oct. 11, 2018

(65) Prior Publication Data
US 2021/0115253 A1    Apr. 22, 2021

(30) Foreign Application Priority Data

Apr. 4, 2017 (JP) .............................. JP2017-074748

(51) Int. Cl.
| | | |
|---|---|---|
| *C09D 183/16* | (2006.01) | |
| *C08K 5/16* | (2006.01) | |
| *C08L 83/16* | (2006.01) | |
| *C08J 7/048* | (2020.01) | |
| *B05D 3/06* | (2006.01) | |
| *C08G 77/62* | (2006.01) | |
| *C08J 5/18* | (2006.01) | |
| *C08K 5/01* | (2006.01) | |
| *C08K 5/18* | (2006.01) | |
| *C08K 5/34* | (2006.01) | |
| *C08L 83/04* | (2006.01) | |

(52) U.S. Cl.
CPC .............. *C08L 83/16* (2013.01); *B05D 3/067* (2013.01); *C08G 77/62* (2013.01); *C08J 5/18* (2013.01); *C08J 7/048* (2020.01); *C08K 5/01* (2013.01); *C08K 5/18* (2013.01); *C08K 5/34* (2013.01); *C08L 83/04* (2013.01); *C08J 2383/16* (2013.01); *C08L 2201/14* (2013.01); *C08L 2203/16* (2013.01); *C08L 2203/20* (2013.01); *C08L 2205/02* (2013.01)

(58) Field of Classification Search
CPC ......... C08L 83/16; C09D 183/16; C08J 7/048
See application file for complete search history.

(56) References Cited

U.S. PATENT DOCUMENTS

| | | | | |
|---|---|---|---|---|
| 8,309,228 | B2 * | 11/2012 | Dierdorf .............. | C09D 183/16 428/451 |
| 2009/0286086 | A1 * | 11/2009 | Dierdorf .............. | C09D 183/16 428/412 |
| 2010/0166977 | A1 * | 7/2010 | Brand et al. .......... | C08J 7/0427 427/515 |
| 2010/0234540 | A1 * | 9/2010 | Ozaki .................. | C09D 183/16 525/474 |
| 2013/0309503 | A1 * | 11/2013 | Shin ...................... | C08J 7/0427 428/413 |
| 2016/0264820 | A1 * | 9/2016 | Kikuchi ................. | B32B 17/00 |

FOREIGN PATENT DOCUMENTS

| | | | |
|---|---|---|---|
| EP | 2206746 A1 | | 7/2010 |
| EP | 3048146 A1 | | 7/2016 |
| JP | 2009-111029 A | * | 5/2009 |
| JP | 2012006154 A | | 1/2012 |
| JP | 2012148416 A | | 8/2012 |
| JP | 2017-200861 A | * | 11/2017 |
| WO | WO-2016169631 A1 | | 10/2016 |

OTHER PUBLICATIONS

International Search Report for PCT/EP2018/058381 dated Aug. 22, 2018.
Written Opinion of the International Searching Authority for PCT/EP2018/058381 dated Aug. 22, 2018.
U.S. Appl. No. 16/500,253, filed Oct. 2, 2019, Noya et al.

* cited by examiner

*Primary Examiner* — Marc S Zimmer
(74) *Attorney, Agent, or Firm* — Faegre Drinker Biddle & Reath LLP

(57) ABSTRACT

[Problem] To provide a film forming composition and a film forming method capable of forming a film excellent in gas barrier properties. [Means for Solution] A film forming composition comprising a polysilazane, an organic solvent and an additive having a specific structure, and a film forming method comprising applying the composition on a substrate and exposing the composition to light. This specific additive is represented by a specific general formula among those having a nonconjugated cyclic structure composed of atoms selected from the group consisting of carbon, nitrogen and oxygen in the structure.

17 Claims, No Drawings

FILM FORMING COMPOSITION AND FILM FORMING METHOD USING THE SAME

CROSS-REFERENCE TO RELATED APPLICATIONS

This application is a national stage application (under 35 U.S.C. § 371) of PCT/EP2018/058381, filed Apr. 3, 2018, which claims benefit of Japanese Application No. 2017-074748, filed Apr. 4, 2017, both of which are incorporated herein by reference in their entirety.

BACKGROUND OF THE INVENTION

Technical Field

The present invention relates to a composition for forming a film having high gas barrier properties which can be used for manufacturing a display device and a semiconductor element, and a film forming method using the same.

Background Art

Since the siliceous film has relatively high hardness and sealability, it is used for various applications in the field of manufacturing semiconductor devices, specifically, for those such as a hard coat film for a substrate or a circuit, a gas barrier film and a base material strength-improving film or the like. As such a siliceous film, various types have been investigated.

Among them, a method for forming a film having particularly excellent gas barrier properties has been investigated. In these methods, using polysilazane as a film forming material is also known (for example, Patent Documents 1 and 2).

However, according to the investigation by the inventors of the present invention, a film formed from a film forming material containing polysilazane as a main component has room for improvement in terms of gas barrier properties, and a film forming composition and a film forming method capable forming a film having further improved gas barrier properties have been desired.

PRIOR ART DOCUMENTS

Patent Documents

[Patent document 1] JP-A No. 2012-006154
[Patent document 2] JP-A No. 2012-148416

SUMMARY OF THE INVENTION

Problems to be Solved by the Invention

In view of the above problems, it is an object of the present invention to provide a film having more excellent gas barrier properties as well as a film forming composition and a film forming method, which can easily form such a film.

Means for Solving the Problems

The film forming composition according to the present invention comprises:
a polysilazane,
an organic solvent, and
at least one type of additive selected from the group consisting of the following compounds represented by the general formulae (A) to (H):

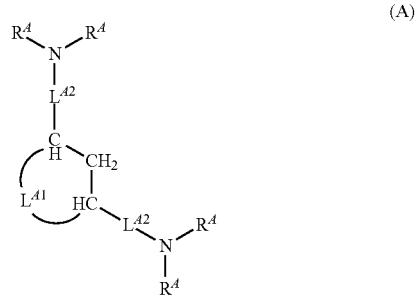

wherein
$L^{A1}$ is a $C_{1-7}$ alkylene or a $C_{1-7}$ heteroalkylene,
$L^{A2}$s are each independently a $C_{1-7}$ alkylene, and
$R^A$s are each independently hydrogen or a $C_{1-3}$ alkyl,

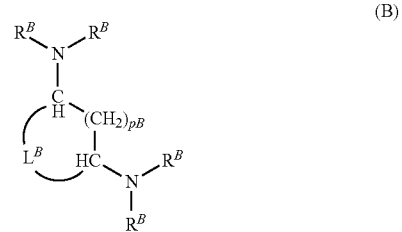

wherein
$L^B$ is a $C_{1-6}$ alkylene or a $C_{1-6}$ heteroalkylene,
$R^B$s are each independently hydrogen or a $C_{1-3}$ alkyl, and
pB is an integer of 1 or 2,

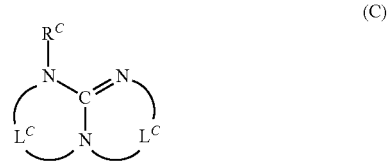

wherein
$L^C$s are each independently a $C_{1-7}$ alkylene or a $C_{1-7}$ heteroalkylene, and
$R^C$ is hydrogen or a $C_{1-3}$ alkyl,

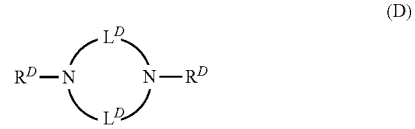

wherein
$L^D$s are each independently a $C_{3-10}$ alkylene or a $C_{1-10}$ heteroalkylene, and
$R^D$s are each independently hydrogen or a $C_{1-3}$ alkyl,

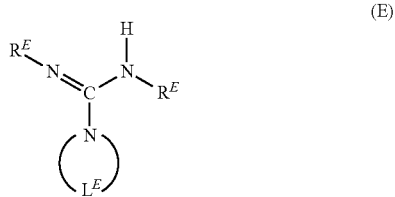
(E)

wherein $L^E$ is a $C_{3-9}$ alkylene or a $C_{3-9}$ heteroalkylene, and $R^E$s are each independently a $C_{1-6}$ alkyl, a $C_{1-6}$ heteroalkyl, a $C_{4-10}$ cycloalkyl or a $C_{4-10}$ heterocycloalkyl,

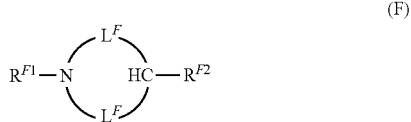
(F)

wherein $L^F$s are each independently a $C_{1-4}$ alkylene or a $C_{1-4}$ heteroalkylene, $R^{F1}$ is hydrogen or a $C_{1-3}$ alkyl, and $R^{F2}$ is a $C_{4-10}$ heteroalkyl or a $C_{4-12}$ heterocycloalkyl, having one or more nitrogen,

(G)

wherein $L^G$ is a $C_{3-9}$ alkylene or a $C_{3-9}$ heteroalkylene, and $R^G$ is a $C_{1-4}$ alkyl or a $C_{1-4}$ heteroalkyl, where $L^G$ or $R^G$ contains one or more nitrogen, and

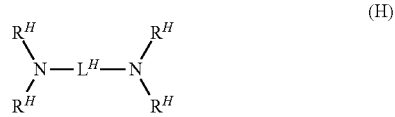
(H)

wherein $L^H$ is a $C_{1-6}$ alkylene, and $R^H$s are each independently hydrogen, a $C_{1-12}$ alkyl or a $C_{4-15}$ cycloalkyl, where at least one of $R^H$s is $C_{4-15}$ cycloalkyl.

Further, the film forming method according to the present invention comprises the following steps:

(1) a coating step of applying said composition on a substrate made of an organic material to form a composition layer, and (2) an exposure step of exposing the composition layer to light.

Further, electronic devices, medical devices, packaging containers or wrapping papers according to the present invention comprise a film formed by said method.

Effects of the Invention

According to the present invention, it is possible to easily form a film having excellent gas barrier properties.

DETAILED DESCRIPTION OF THE INVENTION

Embodiments of the present invention are described below in detail.

MODE FOR CARRYING OUT THE INVENTION

In the present specification, when numerical ranges are indicated using "to", unless otherwise specifically mentioned, they include both endpoints, and units thereof are common. For example, 5 to 25 mol % means 5 mol % or more and 25 mol % or less.

In the present specification, the descriptions such as "$C_{x-y}$", "$C_x$-$C_y$" and "$C_x$" mean the number of carbons in a molecule or substituent. For example, $C_{1-6}$ alkyl means an alkyl chain having 1 or more and 6 or less carbons (methyl, ethyl, propyl, butyl, pentyl, hexyl etc.).

In the present specification, unless otherwise specifically mentioned, "alkyl" means a linear or branched alkyl, and "cycloalkyl" means an alkyl containing a cyclic structure. Those in which a cyclic structure is substituted with a linear or branched alkyl are also referred to as cycloalkyl. Further, those having a polycyclic structure such as bicycloalkyl are also included in cycloalkyl. "Heteroalkyl" means an alkyl containing oxygen or nitrogen in the main chain or side chain unless otherwise specifically mentioned and means an alkyl including, for example, oxy, hydroxy, amino, carbonyl and the like. Further, "hydrocarbyl group" means a monovalent, divalent or higher group comprising carbon and hydrogen and optionally containing oxygen or nitrogen. Furthermore, in the present specification, unless otherwise specifically mentioned, "alkylene" means a divalent group corresponding to said alkyl and includes, for example, linear alkylene or branched alkylene having a side chain.

In the present specification, when a polymer has plural types of repeating units, these repeating units copolymerize. Unless otherwise specifically mentioned, these copolymerization is any of alternating copolymerization, random copolymerization, block copolymerization, graft copolymerization, or a mixture thereof.

In the present specification, unless otherwise specifically mentioned, Celsius is used as the temperature unit. For example, 20 degrees means 20 degrees Celsius.

In the present specification, unless otherwise specifically mentioned, "%" means "% by mass" and "parts" means "parts by mass".

Film Forming Composition

The film forming composition according to the present invention (hereinafter sometimes referred to as "composition") comprises, as essential components, a polysilazane, an organic solvent, and a specific additive, and optionally contains other additional components. These components are described below.

Polysilazane

Although polysilazane used in the film forming composition according to the present invention is not particularly limited, it typically has a structural unit represented by the following general formula (1):

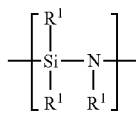

(1)

wherein $R^1$s are groups each independently selected from the group consisting of hydrogen, alkyl, alkenyl, cycloalkyl, aryl, alkoxy, amino and silyl. At least one of $R^1$ is hydrogen. When $R^1$ is a group other than hydrogen, $R^1$ is unsubstituted or substituted by one or more of groups selected from the group consisting of halogen, alkyl, alkoxy, amino, silyl and alkylsilyl. Specific examples of $R^1$ having such a substituent include fluoroalkyl, perfluoroalkyl, silylalkyl, trisilylalkyl, al kylsilylalkyl, trialkylsilyl, alkoxysilylalkyl, fluoroalkoxy, silylalkoxy, alkylamino, dialkylamino, alkylaminoalkyl, alkylsilyl, dialkylsilyl, alkoxysilyl, dialkoxysilyl and trialkoxysilyl. Among them, said $R^1$s are preferably groups each independently selected from the group consisting of (a) hydrogen, (b) alkyl such as methyl, ethyl or propyl, (c) alkenyl such as vinyl or allyl, (d) aryl such as phenyl, (e) alkylsilyl such as trimethylsilyl, and (f) alkoxysilylalkyl such as triethoxysilylpropyl.

Polysilazane comprising mainly a structural unit represented by said general formula (1) is one having a linear structure. However, it is also possible in the present invention to use polysilazane having a structure other than it, namely, a branched chain structure or a cyclic structure. Such polysilazane comprises structures of the following formulae:

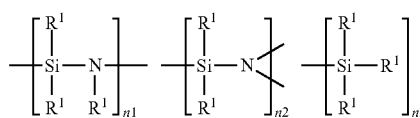

(1a)

wherein n1, n2 and n3 represent the polymerization ratio, and usually, n1+n2+n3 is 1.

Polysilazane represented by these formulae is categorized into organopolysilazane, wherein $R^1$ contains an organic group, and perhydropolysilazane, wherein all of $R^1$s are hydrogen. In the present invention, it is preferable to use perhydropolysilazane, wherein all of $R^1$s are hydrogen. These polysilazane can be produced by any conventionally known method.

It is also possible to use metallopolysilazane modified with a metal compound at a part of these polysilazane, borosilazane containing boron, polysilazane containing a silicone structure, or the like. Conveniently in the present invention, these modified polysilazane are also called polysilazane. In the present invention, two or more of these polysilazane can be also used in combination.

Although the molecular weight of polysilazane used in the present invention is not particularly limited, for example, its number average molecular weight in terms of polystyrene is preferably in the range of 200 to 10,000, more preferably 400 to 5,000.

Organic Solvent

The composition according to the present invention comprises a solvent capable of dissolving said polysiloxane and specific additives to be described below. The solvent is not particularly limited as long as it can dissolve the components to be used. Preferred examples of the solvent include the following:

(a) aromatic hydrocarbon compounds, such as benzene, toluene, xylene, ethylbenzene, diethylbenzene, trimethylbenzene, triethylbenzene and tetrahydro-naphthalene;

(b) saturated hydrocarbon compounds, such as n-pentane, i-pentane, n-hexane, i-hexane, n-heptane, i-heptane, n-octane, i-octane, n-nonane, i-nonane, n-decane and i-decane;

(c) alicyclic hydrocarbon compounds, such as ethylcyclohexane, methylcyclohexane, cyclohexane, cyclohexene, p-menthane, decahydronaphthalene, dipentene and limonene;

(d) alkyl ethers, such as dipropyl ether, dibutyl ether, diethyl ether, dipentyl ether, dihexyl ether, methyl tertiary butyl ether (hereinafter, referred to as MTBE) and anisole; and (e) ketones, such as methyl isobutyl ketone (hereinafter, referred to as MIBK).

Among them, (a) aromatic hydrocarbon compound, (b) saturated hydrocarbon compound, (c) alicyclic hydrocarbon compound, and (d) alkyl ether are preferred, and xylene and dibutyl ether are particularly preferred.

These solvents can be used properly in combination of two or more, so as to control the evaporation rate of the solvent, to reduce the hazardousness to the human body, or to control the solubility of the components.

As such a solvent, it is also possible to use commercially available solvents. For example, T-SOL 3040, T-SOLAN 45, Exxsol D30, Exxsol D40, Exxsol D80, Solvesso 100, Solvesso 150, Isopar H, Isopar L (trade name: manufactured by TonenGeneral Sekiyu KK), New Solvent A, Cactus Fine SF-01, Cactus Fine SF-02 (trade name: manufactured by JX Energy Corporation), Shellsol MC311, Shellsol MC811, Sol Eight Deluxe, New Shell Bright Sol (trade name: manufactured by Shell Chemicals Japan Ltd.) are commercially available and these can be also used. Incidentally, if a mixture of solvents is used, the content of an aromatic hydrocarbon compound is preferably not more than 30% by mass based on the total mass of the solvent mixture from the viewpoint of reducing the hazardousness to the human body.

Additive

The composition according to the present invention comprises a specific additive. One feature of this additive is to have a nonconjugated cyclic structure composed of atoms selected from the group consisting of carbon, nitrogen and oxygen, in the structure. Further, this additive is characterized by containing two or more nitrogen atoms in one molecule.

However, even one having such a structure, the effect of the present invention cannot be always sufficiently exhibited, and the additive is needed further to have a specific structure.

Additives that can be used in the composition according to the present invention include those having the following structures (A) to (H):

[Additive (A)]

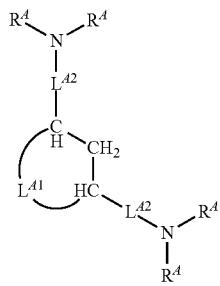
(A)

wherein $L^{A1}$ is a $C_{1-7}$ alkylene or a $C_{1-7}$ heteroalkylene, preferably a $C_{2-4}$ alkylene, $L^{A2}$s are each independently a $C_{1-3}$ alkylene, preferably a $C_{1-2}$ alkylene, more preferably $-CR^{A'}_2-$, where $R^{A'}$s are each independently hydrogen or a $C_{1-3}$ alkyl, preferably all of $R^{A'}$s are hydrogen, and $R^A$s are each independently hydrogen or a $C_{1-3}$ alkyl, preferably all of $R^A$s are hydrogen.

Specific examples of such additives include the following compounds:

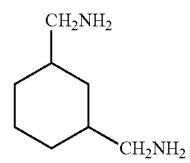
(A-1)

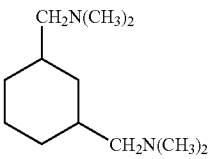
(A-2)

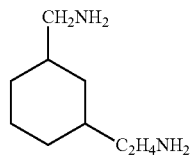
(A-3)

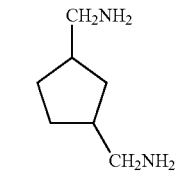
(A-4)

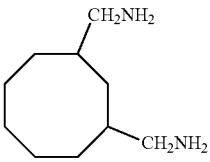
(A-5)

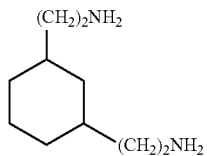
(A-6)

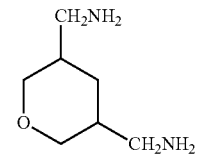
(A-7)

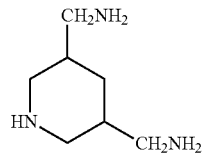
(A-8)

Among them, (A-1) and (A-4) are particularly preferable.

[Additive (B)]

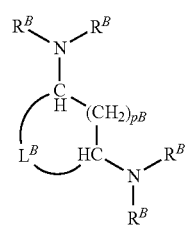
(B)

wherein $L^B$ is a $C_{1-6}$ alkylene or a $C_{1-6}$ heteroalkylene, preferably a $C_{2-5}$ alkylene, $R^B$s are each independently hydrogen or a $C_{1-3}$ alkyl, preferably at least one of $R^B$ is a $C_{1-3}$ alkyl, more preferably two $R^B$s bonded to one nitrogen are $C_{1-3}$ alkyl, and pB is an integer of 1 or 2, preferably pB is 1.

Specific examples of such additives include the following compounds:

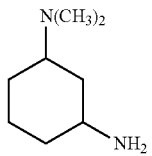
(B-1)

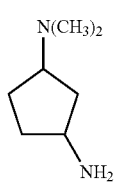
(B-3)

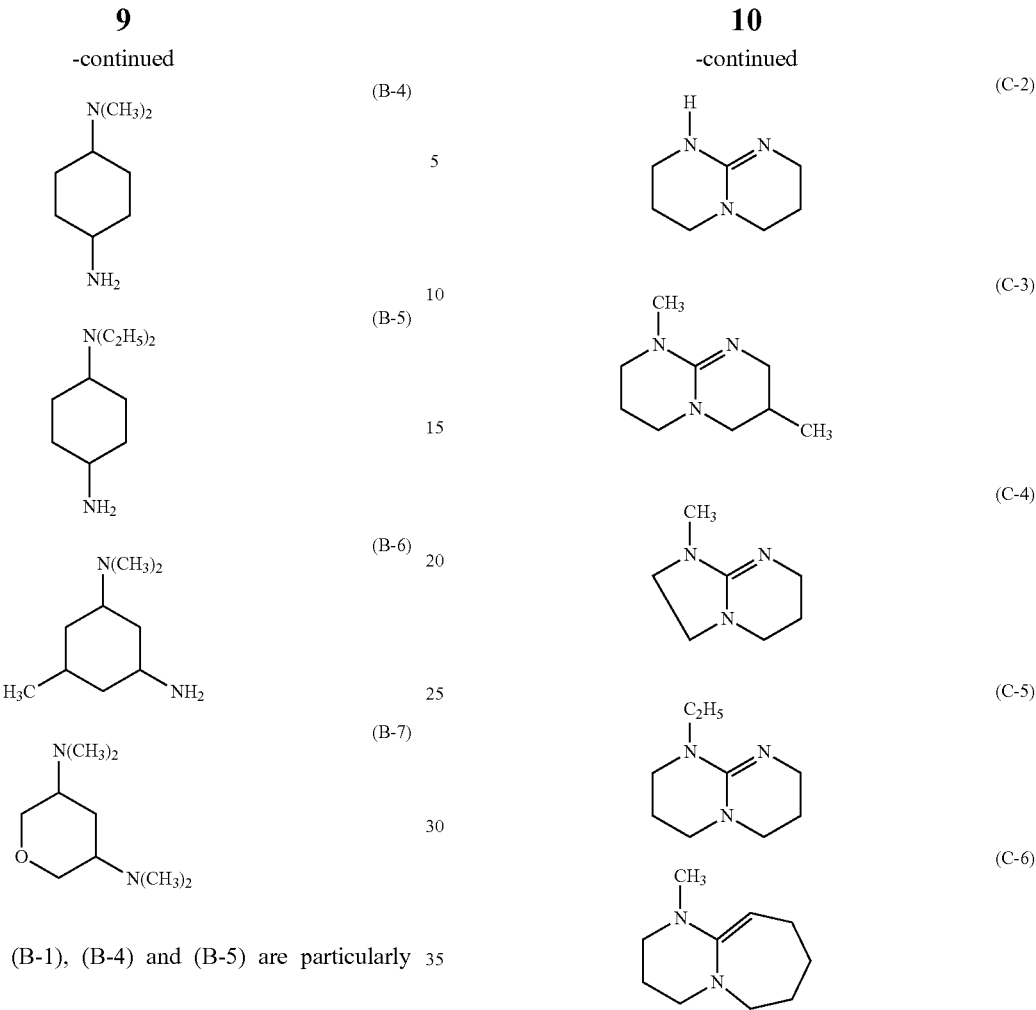

Among them, (B-1), (B-4) and (B-5) are particularly preferable.

[Additive (C)]

(C)

wherein $L^C$s are each independently a $C_{1-7}$ alkylene or a $C_{1-7}$ heteroalkylene, preferably each independently a $C_{2-4}$ alkylene, more preferably two $L^C$s are identical, and $R^C$ is hydrogen or a $C_{1-3}$ alkyl.

Specific examples of such additives include the following compounds:

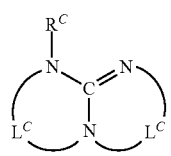

Among them, (C-1) and (C-2) are particularly preferable.

[Additive (D)]

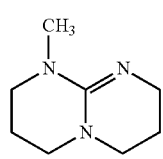

wherein $L^D$s are each independently a $C_{3-10}$ alkylene or a $C_{1-10}$ heteroalkylene, preferably a $C_{2-6}$ heteroalkylene, and $R^D$s are each independently hydrogen or a $C_{1-3}$ alkyl, preferably hydrogen.

Here, when $L^D$ is heteroalkylene, the heteroatom, that is oxygen or nitrogen, is preferably bonded by —$CR^{D0}_2$—$CR^{D0}_2$—, wherein $R^{D0}$ are each independently hydrogen or a $C_{1-3}$ alkyl. Further, it is preferable that the heteroatom oxygen is bonded by the linking group, in a structure of —O—, and that the heteroatom nitrogen is bonded by the linking group, in a structure of —$NR^D$— wherein $R^D$ is hydrogen or a $C_{1-3}$ alkyl.

Specific examples of such additives include the following compounds:

(D-1)
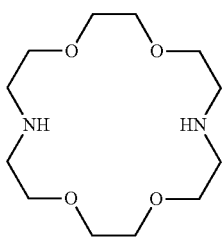

(D-2)
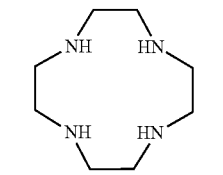

(D-3)
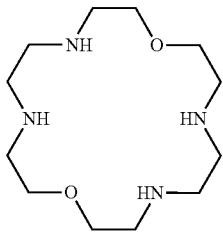

(D-4)
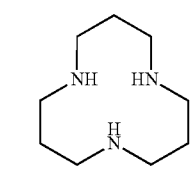

(D-5)
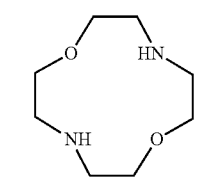

(D-6)
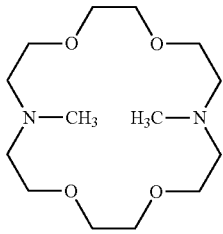

Among them, (D-1) and (D-2) are particularly preferable.

[Additive (E)]

(E)
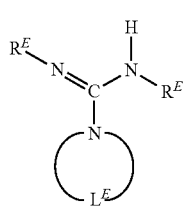

wherein $L^E$ is a $C_{3-9}$ alkylene or a $C_{3-9}$ heteroalkylene, preferably a $C_{3-7}$ heteroalkylene, and $R^E$s are each independently a $C_{1-6}$ alkyl, a $C_{1-6}$ heteroalkyl, a $C_{4-10}$ cycloalkyl or a $C_{4-10}$ heterocycloalkyl, preferably each independently a $C_{4-10}$ cycloalkyl or a $C_{4-10}$ heterocycloalkyl.

Specific examples of such additives include the following compounds:

(E-1)
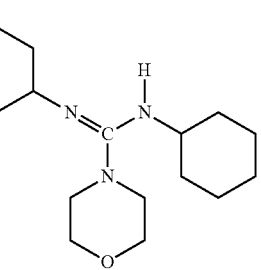

(E-2)
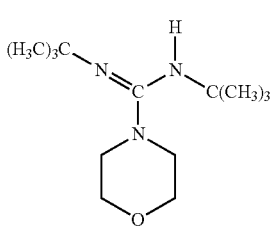

(E-3)
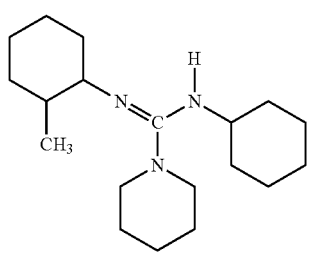

Among them, (E-1) is particularly preferable.

[Additive (F)]

(F)
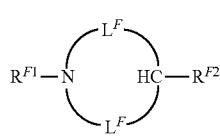

wherein $L^F$s are each independently a $C_{1-4}$ alkylene or a $C_{1-4}$ heteroalkylene, preferably each independently a $C_{1-4}$ alkylene, $R^{F1}$ is hydrogen or a $C_{1-3}$ alkyl, and $R^{F2}$ is a $C_{4-10}$ heteroalkyl or a $C_{4-12}$ heterocycloalkyl, having one or more nitrogen, preferably a $C_{4-12}$ heterocycloalkyl having one or more nitrogen.

Specific examples of such additives include the following compounds:

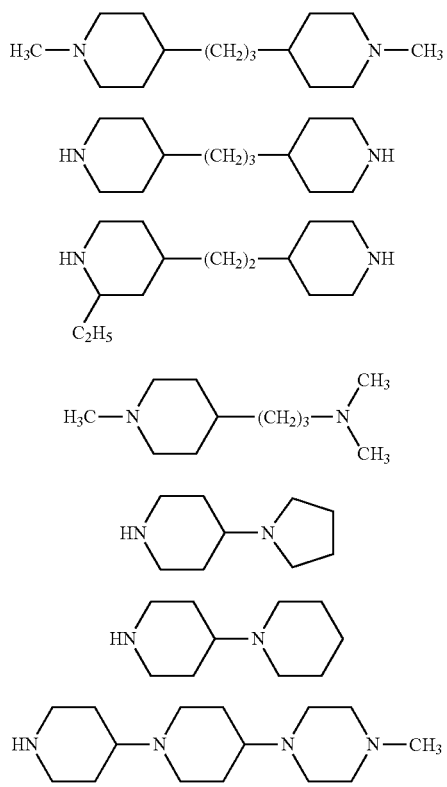

(F-1) (F-2) (F-3) (F-4) (F-5) (F-6) (F-7)

Among them, (F-1) is particularly preferable.

[Additive (G)]

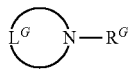

(G)

wherein $L^G$ is a $C_{3-9}$ alkylene or a $C_{3-9}$ heteroalkylene, preferably a $C_{3-9}$ alkylene, and $R^G$ is a $C_{1-4}$ alkyl or a $C_{1-4}$ heteroalkyl, where $L^G$ or $R^G$ contains one or more nitrogen.

Specific examples of such additives include the following compounds:

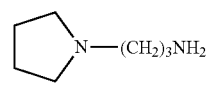

(G-1)

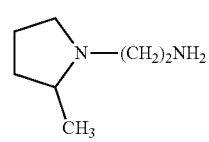

(G-2)

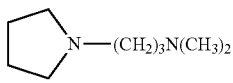

(G-3)

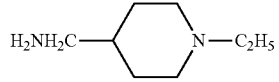

(G-4)

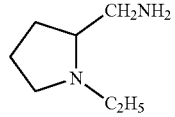

(G-5)

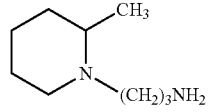

(G-6)

Among them, (G-1) and (G-2) are particularly preferable.

[Additive (H)]

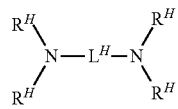

(H)

wherein $L^H$ is a $C_{1-6}$ alkylene, and $R^H$s are each independently hydrogen, a $C_{1-12}$ alkyl or a $C_{4-15}$ cycloalkyl, where at least one of $R^H$ is a $C_{4-15}$ cycloalkyl.

Specific examples of such additives include the following compounds:

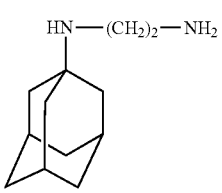

(H-1)

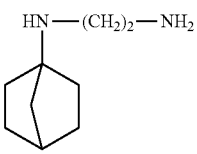

(H-2)

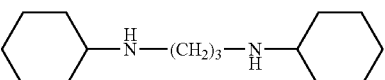

(H-3)

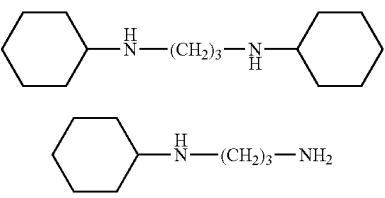

(H-4)

-continued

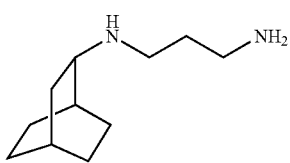

(H-5)

Among them, (H-1) is particularly preferable.

In the composition according to the present invention, two or more of these additives (A) to (H) can be used in combination.

Additional Component

In addition, the composition according to the present invention comprises an additional component other than additives (A) to (H). As such an additional component, amine compounds or metal complex compounds can be mentioned. These compounds work as a catalyst at the time when the composition coated on a substrate performs a curing reaction.

Here, the amine compound is an amine compound having a structure other than the above-mentioned additives (A) to (H). As the amine compound, any one can be used, and their preferable examples include aliphatic amines, aromatic amines, or heterocyclic amines. The aliphatic amine or aromatic amine is either of primary amine, secondary amine or tertiary amine.

In addition, these can be monoamines, diamines or triamines etc., that is, the number of nitrogen can be freely selected. Examples of the heterocyclic amine include compounds comprising a pyrrole ring, a pyridine ring, a pyrazine ring, a pyrimidine ring, a triazole ring, and the like. In addition, these amine compounds are unsubstituted or substituted by any substituent, for example, a group selected from the group consisting of alkoxy, alkylene, silyl, and alkylsilyl.

Specific examples of the preferred amine compound include dipropylamine, diisopropylamine, tripropylamine, butylamine, dibutylamine, tributylamine, isobutylamine, diisobutylamine, tert-butylamine, pentyl-amine, tripentylamine, hexylamine, N-methylhexylamine, N,N-dimethylhexylamine, N,N-dimethyl-2-ethylhexyl-amine, heptylamine, octylamine, di-n-octylamine, N-methyl-di-n-octylamine, tri-n-octylamine, N,N,N',N'-tetramethyldiaminomethane, N,N'-dimethylethylenediamine, N,N,N',N'-tetramethylethylenediamine, N,N,N',N'-tetramethyl-1,3-propanediamine, N,N,N',N'-tetramethyl-1,4-butanediamine, N,N-di-tert-butyl-ethylenediamine, N,N,N',N'-tetramethylhexamethylene-diamine, N,N,N',N'-tetramethyl-1,8-octanediamine, allyl-amine, diallylamine, triallylamine, N-methyldiallylamine, N,N-dimethylallylamine, benzylamine, dibenzylamine, N-methylbenzylamine, N,N-dimethylbenzylamine, pyrrole, pyrroline, pyridine, picoline, lutidine, pyrazine, aminopyridine, aminomethylpyridine, phenylpyridine, vinylpyridine, aminopyrazine, 2-methoxyethylamine, 3-methoxypropylamine, 3-ethoxypropylamine, 3-propoxypropylamine, 3-isopropoxypropylamine, 3-butoxypropylamine, bis(2-aminoethyl ether), bis(3-aminopropyl ether), 3-(2-dimethylaminoethoxy) propyl-amine, hexamethyldisilazane, tetramethyldisilazane, and heptamethyldisilazane.

Any metal complex compound also can be used as long as it is possible to promote the curing reaction of the film. Specifically, one comprising a metal selected from the group consisting of nickel, titanium, platinum, rhodium, cobalt, iron, iridium, aluminum, ruthenium, palladium, rhenium, and tungsten is preferable. In addition, one comprising a ligand selected from the group consisting of acetylacetonate, carbonyl and carboxylate is preferable. Here, the carboxylate group is preferably a residue of carboxylic acid selected from formic acid, acetic acid, propionic acid, butyric acid, octanoic acid, lauric acid, stearic acid, oleic acid, lactic acid, succinic acid and citric acid.

Preferred specific examples of the metal complex compound include tris(acetylacetonato)aluminum, tris(acetylacetonato)iron, tris(acetylacetonato)rhodium, tris(acetylacetonato)cobalt, tris(acetylacetonato)-ruthenium, bis(acetylacetonato)palladium, tungsten hexacarbonyl, triruthenium dodecacarbony, dirhenium dodecacarbonyl, palladium acetate, palladium propionate, nickel benzoate, nickel octanoate, nickel oleate, iron formate, cobalt benzoate, cobalt citrate, cobalt formate, rhodium triacetate, dirhodium tetraacetate, titanium oleate, aluminum gluconate, aluminum benzoate, and aluminum butylate.

In addition, the composition according to the present invention further comprises, as an additional component, a polysiloxane represented by the following general formula (2):

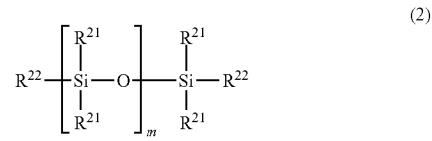

(2)

wherein $R^{21}$s are groups each independently selected from the group consisting of hydrogen, alkyl, alkenyl, cycloalkyl, aryl, alkoxy, amino and alkylsilyl, where $R^{21}$ is unsubstituted or substituted by one or more groups selected from the group consisting of halogen, alkyl, alkoxy, amino, silyl and alkylsilyl when $R^{21}$ is a group other than hydrogen, and the total number of all amino and alkoxy in the formula is 5% or less based on the total number of all $R^{21}$ in the formula, $R^{22}$s are each independently a $C_{1-8}$ hydrocarbon group, or $-R^{23}-N-R^{24}_2$ wherein $R^{23}$ is a $C_{1-5}$ hydrocarbon group and $R^{24}$s are each independently hydrogen or a $C_{1-3}$ hydrocarbon group, and m is a number indicating polymerization degree.

Further, $R^{21}$ may contain, in such a range that is not detrimental to the effect of the present invention, i.e. a trace amount of reactive group. Specifically, when the total number of amino and alkoxy contained in all of $R^{21}$s is 5% or less, preferably 3% or less, of the total number of $R^{21}$, the effect of the present invention can be exhibited. On the other hand, if $R^{21}$ contains hydroxy, carboxyl, etc., hydroxy having high hydration will remain in the film, thus making it difficult to improve the gas barrier properties. Therefore, it is preferable that $R^{21}$ does not contain hydroxy or carboxyl.

$R^{22}$ is a terminal group bonded to silicon existing at the end of the polysiloxane main chain. Although the reaction mechanism in the case where such a polysiloxane is contained is not sufficiently elucidated, it is presumed that this terminal group moiety is bonded to the polysilazane, which is described later, to stabilize the nitrogen in the polysilazane, thereby realizing high gas barrier properties. Further, in order to appropriately proceed the reaction between polysiloxane and polysilazane, it is preferable that $R^{22}$ is a specific one.

Typically, $R^{22}$ is a $C_{1-8}$ hydrocarbon group. Further, a part of the carbons contained in such a hydrocarbon group can be replaced with nitrogen. As the hydrocarbon group replaced with nitrogen, —$R^{23}$—N—$R^{24}{}_2$ can be mentioned. Here, $R^{23}$ is a $C_{1-5}$ hydrocarbon group, and $R^{24}$s are each independently hydrogen or a $C_{1-3}$ hydrocarbon group. As $R^{22}$, one having appropriate reactivity is selected as described above, and specifically, it is preferable to be a group selected from the group consisting of methyl, ethyl, propyl, aminomethyl, aminoethyl, aminopropyl, or N-ethylamino-2-methylpropyl. Incidentally, a plurality of $R^{12}$s are contained in the polysiloxane represented by the formula (2), and they are identical or different.

Although the molecular weight of polysiloxane used in the present invention, which is represented by the formula (2), is not particularly limited, for example, its mass average molecular weight in terms of polystyrene is preferably in the range of 500 to 100,000, more preferably in the range of 1,000 to 50,000.

The composition according to the present invention also comprises, as an additional component, a silicon compound represented by the following general formula (3):

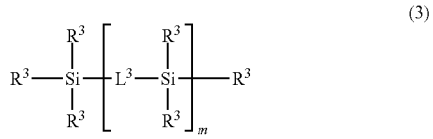

wherein $R^3$s are each independently a monovalent group selected from the group consisting of hydrogen, halogen, hydrocarbyl group, hydroxy, hydrocarbyl-hydroxy, acyl, acyloxy, amino, hydrocarbyl-amino, hydrocarbyl-oxy, silyl, hydrocarbyl-silyl, imino-containing hydrocarbyl group, and imino-containing hydrocarbyl-amino, or a bivalent hydrocarbon chain which is unsubstituted or substituted by halogen, hydroxyl or amino, or $R^3$ is a single bond and can form a cyclic structure bonded with different silicons, $L^3$ is a linking group selected from the group consisting of single bond, oxy, imide, imino, carbonyl, carbonyloxy and unsaturated bond, and hydrocarbon chain which comprises any one of the aforementioned groups, where said linking group comprises alicyclic, aromatic ring or heterocycle, and m is a number of zero or more, indicating polymerization degree.

The silicon compound represented by the formula (3) is characterized by being changed at an exposure step to react with the polysilazane. For this reason, the composition comprising this additional component does not require complicated operations to form a dense film. Further, it also does not require high temperature treatment that causes high energy cost.

The silicon compound preferably has less hydrogen directly bonded to silicon. Depending on the basic structure of the silicon compound, the optimum number of silicon varies, but in general the number of hydrogen bonded to each silicon in the molecule is 2 or less, preferably 1 or less.

Among the compounds included in the formula (3), those exhibiting excellent properties are shown below:

(3A) Silicon Compound Having Silicon-Silicon Bond

One preferred embodiment of the silicon compound is one having a structure in which silicon and silicon are directly bonded to each other. That is, in the general formula (3), it is one in which $L^3$ is a single bond. Further, in this case, it is preferable that the hydrocarbyl group contained in the substituent $R^3$ is a saturated hydrocarbyl group. More specifically, it is represented by the following general formula (3A):

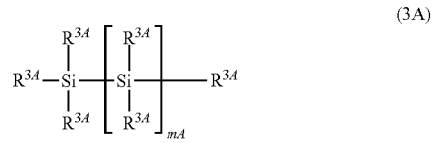

wherein
$R^{3A}$s are each independently a monovalent group selected from the group consisting of hydrogen, halogen, hydroxy, alkyl, cycloalkyl, alkoxy, aryl, aralkyl, acyl, acyloxy, alkylamino, amino, silyl, and alkylsilyl, or $R^{3A}$ is a single bond and can form a cyclic structure bonded with different silicons, and mA is a number of 1 or more, indicating polymerization degree.

Here, it is preferable that said $R^{3A}$s are each independently a group selected from the group consisting of alkyl, alkoxy, silyl, silylalkyl, and alkylsilyl. Further, it is more preferable that said $R^{3A}$s are each independently a group selected from the group consisting of $C_{1-4}$ alkyl, $C_{1-3}$ alkoxy, and $C_{1-3}$ alkylsilyl. Furthermore, it is particularly preferred that the $R^{3A}$s are each independently selected from the group consisting of methyl, ethyl, t-butyl, trimethylsilyl, methoxy, and ethoxy.

Further, the silicon compound represented by the formula (3A) can have a cyclic structure composed of silicons. That is, $R^{3A}$ bonded to a silicon and $R^{3A}$ bonded to other silicon composes an identical single bond. In this case, the silicon compound becomes a cyclopolysilane.

In addition, since this compound has a silicon-silicon bond, mA is 1 or more. When this compound has a chain structure, mA is preferably 10 or less, more preferably 6 or less, and particularly preferably 2 or less. Further, when this compound has a cyclic structure, mA is 3 or more, preferably 5 or more, preferably 6 or more, and preferably 10 or less.

In addition, it is preferable in this compound that the number of hydrogen atoms directly bonded to each silicon is small. Specifically, when the silicon compound represented by the formula (3A) has a chain structure, the number of hydrogen bonded to each silicon is preferably 1 or less, more preferably zero. When the silicon compound represented by the formula (3A) has a cyclic structure, the number of hydrogen bonded to each silicon is preferably 2 or less, more preferably 1 or less.

(3B) Silicon Compound Containing Ethylenic Bond or Acetylenic Bond

In another preferable embodiment, the silicon compound contains an ethylenic bond or an acetylenic bond in the molecule. That is, at least one of $R^3$ or $L^3$ in the general formula (3) contains an ethylenic bond or an acetylenic bond. In this respect, it is preferable that hydrogen is not directly bonded to the silicon contained in the molecule. More specifically, it is represented by the following general formula (3B).

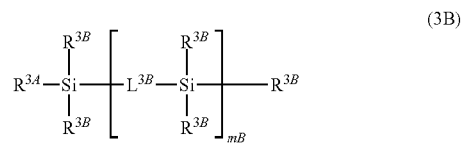

wherein $R^{3B}$s are each independently a monovalent group selected from the group consisting of alkyl, cycloalkyl, aryl, aryloxy, heteroaryl, aralkyl, alkenyl, alkynyl, hydroxy, hydroxyalkyl, hydroxyalkenyl, acyl, acyloxy, alkylamino, alkyloxy, silyl, and alkylsilyl, $L^{3B}$ is a linking group selected from the group consisting of single bond, oxy, imide, imino, carbonyl, carbonyloxy, and unsaturated bond, as well as hydrocarbon chain which comprises any one of the aforementioned groups, and mB is a number of zero or more, indicating polymerization degree.

In addition, an ethylenic bond or an acetylenic bond is contained in at least one of $R^{3B}$ and $L^{3B}$.

The ethylenic bond or acetylenic bond can be contained in any form in the molecule, but in one preferred embodiment, at least one of $L^{3B}$ contains an acetylenic bond or an ethylenic bond. In this respect, $L^{3B}$ itself is an acetylenic bond or an ethylenic bond, or $L^{3B}$ is one to which a hydrocarbon chain is linked, for example, a propenylene group (—CH$_2$—CH=CH—).

Further, the monovalent group $R^{3B}$ that is bonded to silicon contains or does not contain an ethylenic bond or an acetylenic bond. Specifically, at least one of $R^{3B}$s is preferably selected from the group consisting of ethynyl (sometimes referred to as acetylene group) and vinyl. In particular, it is preferred that $L^{3B}$ is selected from the group consisting of single bond, oxy, and imino, and that at least one of $R^{3B}$s is a monovalent group selected from the group consisting of ethynyl and vinyl.

Further, the mass average molecular weight of the silicon compound represented by the formula (3B) is preferably 50 to 200,000. Here, "mass average molecular weight" means a mass average molecular weight in terms of polystyrene.

Further, it is also preferable that two or more ethylenic bonds or acetylenic bonds are contained in one silicon compound. More specifically, it is preferred that mB is 1 or more, the silicon compound is oligomeric or polymeric, $L^{3B}$ is oxy or imino, and each of the two $R^{3B}$s existing at both ends has an ethylenic bond or an acetylenic bond.

(3C) Silicon Compound in which Silicon and Other Silicon are Bonded by Alkylene or Arylene Another preferred embodiment of the silicon compound is one in which silicon and other silicon are bonded by alkylene or arylene. That is, $L^3$ in the general formula (3) is alkylene or arylene. In this respect, in $L^3$ and $R^3$, any ethylenic bond or acetylenic bond is not contained, and oxy can be contained. In addition, it is preferable that hydrogen is not bonded to silicon contained in the molecule. More specifically, it is represented by the following general formula (3C):

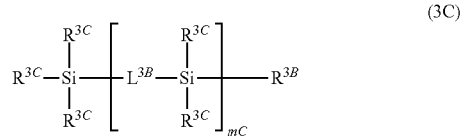

(3C)

wherein $R^{3C}$s are each independently a monovalent group selected from the group consisting of alkyl, cycloalkyl, heterocycloalkyl, aryl, heteroaryl, arylamino, hydroxy, hydroxyalkyl, acyl, acyloxy, amino, alkylamino, alkyloxy, silyl, and alkylsilyl, $L^{3C}$ is a linking group selected from the group consisting of alkylene and arylene, which contains or does not contain oxy, and mC is a number of 1 or more, indicating polymerization degree.

In addition, all of $R^{3C}$ and $L^{3C}$ contain no ethylenic bond or acetylenic bond. Here, any conjugated bond contained in the aromatic ring shall not be regarded as an ethylenic bond.

In the silicon compound represented by the general formula (3C), $L^{3C}$ contains or does not contain oxy. Specifically, it is preferred to be selected from the group consisting of hydrocarbyl group, oxy-containing hydrocarbyl group, hydrocarbyl dioxy, and hydrocarbyl ether dioxy. In addition, $L^{3C}$ is more preferably selected from the group consisting of 1,2-ethanedioxy, 1,4-butanedioxy, 1,6-hexanedioxy, 1,4-cyclohexanedioxy, bis(2-oxyethyl) ether, ethylene, tetramethylene, hexamethylene, and phenylene.

Further, in the silicon compound represented by the general formula (3C), mC is preferably 1, in particular.

(3D) Monosilane Compound Completely Substituted with Bulky Hydrocarbyl Group

Another preferred embodiment of the silicon compound is a monosilane compound containing only one silicon, wherein the bonded substituent is a hydrocarbyl group or a hydrocarbyl amino. In addition, the total number of carbon and nitrogen, which are contained in the compound as a whole, is 8 or more. More specifically, it is represented by the following general formula (3D):

(3D)

wherein $R^{3D}$s are each independently a monovalent group selected from the group consisting of alkyl, aryl, alkylamino, arylamino, imino-containing alkyl, and imino-containing alkylamino, wherein hydrogen bonded to each silicon is 1 or less and the total number of carbon and nitrogen, which are contained in all of $R^{3D}$s, is 8 or more.

In this silicon compound, the total number of carbon and nitrogen, which are contained in the compound, is not particularly limited unless it impairs the effect of the invention, but it is generally 48 or less, preferably 40 or less.

More specifically, $R^{3D}$ is preferably selected from the group consisting of $C_{1-10}$ alkyl, $C_{6-12}$ aryl, $C_{1-10}$ alkylamino, $C_{6-12}$ arylamino, imino-containing $C_{1-10}$ alkyl, and imino-containing $C_{1-10}$ alkylamino.

The composition according to the present invention also contains other additive components as necessary. Examples of such components include viscosity modifiers, crosslinking accelerators and the like. Further, when used in a semiconductor device, a phosphorus compound such as tris(trimethylsilyl) phosphate or the like can be also contained for the purpose of gettering effect of sodium, and the like.

The composition according to the present invention essentially comprises the above-mentioned polysilazane, an organic solvent and a specific additive, but further compounds can be combined if necessary. These materials that can be combined are described below. The components other than the polysilazane, the organic solvent and the specific additive in the entire composition are preferably 50% or less, more preferably 30% or less, based on the total mass.

Film Forming Composition

The composition according to the present invention is prepared by dissolving or dispersing said polysilazane, the additives (A) to (H) and optionally other additives in said organic solvent. Here, the order of dissolving each component in the organic solvent is not particularly limited. Further, it is also possible to replace the solvent after reacting the ingredients.

The content of each of said components varies depending on the use of the desired composition. The content of the additives (A) to (H) can be appropriately adjusted according to the purpose. In general, when the content of the additives (A) to (H) is large, gas barrier properties tend to become high, so that it is preferable. Further, in order not to impair the film denseness after the reaction forming the film, it is preferable that the content of the additives (A) to (H) is small. Therefore, the composition according to the present invention preferably contains 0.002 to 0.5 mmol, more preferably 0.005 to 0.2 mmol, of additives (A) to (H), based on 1 g of polysilazane.

Further, in the present invention, the content of the polymer component is preferably 0.1 to 40% by mass, more preferably 0.1 to 30% by mass, based on the total mass of the composition, in order to form a film having a sufficient thickness. Here, "polymer component" means an additional component represented by the general formulae (2) and (3), in addition to the polysilazane.

Further, when the composition contains an amine compound other than the additives (A) to (H), the amine is preferably not less than a certain amount in order to sufficiently accelerate the curing reaction, and it is preferably not more than a certain amount from the viewpoint of storage stability of the composition. Therefore, the content of the amine compound is preferably 0.005 to 1.00 mmol, more preferably 0.01 to 0.60 mmol, based on 1 g of the polymer.

Further, when the composition contains a metal complex compound, the metal complex compound is preferably not less than a certain amount in order to sufficiently accelerate the curing reaction, and it is preferably not more than a certain amount from the viewpoint of storage stability of the composition. Therefore, the content of the metal complex compound is preferably 0.002 to 0.50 mmol, more preferably 0.005 to 0.20 mmol, based on 1 g of the polymer.

Further, when the composition contains an additional component represented by the general formula (2) or (3), in general, the content of the polysiloxane is large, gas barrier properties tend to become high, and if the content is small, the progress of the film forming reaction tends to be promoted. Therefore, the content of the additional components (2) and (3) is preferably 0.01 parts by mass or more, more preferably 0.1 parts by mass or more, based on 100 parts by mass of the polysilazane. Further, the content of polysiloxane is preferably 25 parts by mass or less, more preferably 8 parts by mass or less, based on 100 parts by mass of the polysilazane.

Film Forming Method

Further, the film forming method according to the present invention comprises:
(1) coating step of applying said film forming composition on a substrate to form a composition layer, and
(2) exposure step of exposing said composition layer to light.

The substrate for applying the composition is not particularly limited, and selected from any of organic materials, inorganic materials, metals, and the like. The film formed according to the present invention is characterized by high gas barrier properties. Therefore, it is preferred that such a film is formed on the surface of a substrate made of an organic material, since a film material having high gas barrier properties can be obtained. These organic materials preferably include plastic films such as polyethylene naphthalate, polyethylene terephthalate, polystyrene, polypropylene, polyethylene, polyimide, polyamide, cellulose acetate, acryl, polycarbonate, and vinyl chloride. Among them, polyethylene naphthalate or polyethylene terephthalate is particularly preferred from the viewpoint of heat resistance and transparency.

Incidentally, the film can be formed not only one side of a substrate but also optionally on both sides of the substrate, in which case it is necessary to select a substrate which is suitable for that purpose.

In the coating step (1), said composition is applied on the surface of said substrate. In the film forming method for preparing a film according to the present invention, the composition is applied to one or both of the substrate surfaces. In this respect, it is also possible to form a film of silicon oxide or silicon nitride on the surface of the substrate before applying the composition. These films can be formed by CVD method, PVD method such as sputtering, ALD method, or the like.

As the method for applying the composition on the substrate surface, it is possible to use conventionally known methods. They include, for example, a spin coating method, a dip coating method, a spray coating method, a roll coating method, a transfer method, a slit coating method, a bar coating method, and the like. The thickness of the composition layer after applied is preferably thicker in order to make it possible for the formed film to exhibit sufficient gas barrier properties. Specifically, it is preferably not less than 10 nm, more preferably not less than 50 nm. In addition, it is preferred that the thickness of the composition layer after applied is appropriately set, so that it can be efficiently cured in the exposure step to be described below. Specifically, it is preferably not more than 900 nm, more preferably not more than 500 nm. Incidentally, in the case of forming a film on both sides of the substrate, it can be coated sequentially on each side, or can be coated simultaneously on both sides.

The composition layer formed on the substrate surface is optionally dried and the excess organic solvent is removed. Especially in the exposure step to be described below, light of a relatively short wavelength is used, so that it is preferable to remove as much as possible the organic solvent, which tends to absorb light of short-wavelength region. In this case, drying can be done more efficiently if it is carried out at a relatively high temperature.

Further, drying can also be carried out under reduced pressure. That is, by applying negative pressure by means of a vacuum pump, a rotary pump, and the like on the substrate after coated, evaporation of the solvent in the composition layer is facilitated, then drying can be accelerated.

The composition layer from which excess solvent is removed by drying can also be optionally subjected to a blowing treatment using an inert gas such as nitrogen. It is possible to increase light irradiating efficiency by removing deposits existing on the composition layer surface through such a treatment. Furthermore, it is possible by irradiating infrared ray to remove the solvent and the like adhered to the surface.

The composition layer obtained in this way is subsequently subjected to the exposure step. Light irradiation conditions in the exposure step are appropriately selected according to thickness, composition, hardness, and the like of the film to be formed.

Light to be irradiated in the exposure step is not particularly limited, and ultraviolet light, visible light, and the like can be mentioned. In the present invention, electron beam, plasma, or the like can also be used as light. It is preferable that a maximum peak wavelength is preferably 161 to 248 nm, preferably 165 to 180 nm. As light source of such a light, any one can be used as long as it can emit light of said wavelength. Typically, xenon excimer laser is used. In addition, it is also possible to use only the required radiation light through a filter or spectrometer by means of a lamp which emits light having a broad wavelength range. Further, exposure can also be performed multiple times. In such a case, it is possible to use light of the same wavelength for each step, or to use light of different wavelength for each step.

The film forming method according to the present invention has a characteristic feature that, by means of this exposure step, said silicon compound is changed to react with the polysilazane. Incidentally, since the portion that curing is accelerated differs in the depth direction in the composition layer in accordance with the wavelength of the irradiated light, it is possible to select the wavelength of light to be irradiated depending on the purpose. That is, curing of the deeper portions in the composition layer can be promoted by irradiating long-wavelength light, and also curing of the shallower portions in the composition layer can be further facilitated by irradiating short-wavelength light.

Further, although the atmosphere for conducting the exposure is freely selected depending on the composition, and the like of the intended film, it is preferable to carry out the light irradiation in an atmosphere, in which oxygen does not penetrate into the film, i.e. in an atmosphere of less oxygen. Specifically, the oxygen content in the atmosphere is preferably not more than 1,000 ppm, more preferably not more than 100 ppm. To satisfy such conditions, it is possible to carry out the light irradiation in vacuum or under reduced pressure and under an inert gas atmosphere. Moreover, it is also effective to carry out the light irradiation after reducing pressure in the atmosphere and then introducing an inert gas. Incidentally, as the inert gas here, nitrogen, argon, helium and mixed gas thereof, and the like are used. In this case, nitrogen is preferably used from the viewpoint of handleability. At this time, nitrogen gas is inert, so that it is neither incorporated into the film, nor increases the composition ratio of nitrogen. Furthermore, it is possible to carry out the light irradiation not only in a sealed container but also in a flow of inert gas. In addition to this, it is also possible, for example, to carry out ultraviolet radiation in ammonia, dinitrogen oxide, and a mixed gas thereof with inert gas. In this case, since ammonia and dinitrogen oxide can become a nitrogen source when a film having a high Si—N content is constituted, gas barrier properties can be further improved by raising the Si—N content in the film using them.

In the exposure step, it is also possible to heat the composition layer simultaneously with the light irradiation. It is possible to further accelerate the curing reaction by such a heating. Further, after the exposure step, it is also possible to promote the curing reaction by additional heating. Heating method is not particularly limited and can be selected from any method such as a method of heating the stage or the like, which sets the substrate, and a method of heating the atmosphere gas. However, in the case that an organic material is used as the substrate, it may be damaged when heating temperature is too high, so that the heating temperature is preferably lower. Specifically, the temperature during the time between curing of the composition layer and forming a film is preferably not higher than 200° C.

The film thus formed is excellent in not only gas barrier properties but also thermal stability and transparency etc. The film can be used as a gas barrier film for electronic devices such as display device and semiconductor device, and also as a protective film or insulating film.

Furthermore, this film can also be applied to medical devices, packaging containers or wrapping papers. Medical devices, packaging containers, and packaging papers, which comprise this film are characterized by low moisture permeability.

The present invention is further explained below by use of the following examples.

Preparation of Film Forming Composition 20 g of perhydropolysilazane (number average molecular weight: 800), 60 g of dibutyl ether, and an additive were mixed in a 500 ml glass beaker and dissolved to prepare a sample solution. After bubbling agitation was conducted by feeding dry nitrogen for 3 minutes to the obtained sample solution, the composition was obtained by diluting with dibutyl ether so as to obtain a desired film thickness.

Types and addition amounts of the additives were as shown in Table 1.

Formation of Gas Barrier Film

The prepared composition was coated on a polyethylene naphthalate film having thickness of 125 μm using a spin coater and then dried. Subsequently, it was heated at 80° C. for 3 minutes. The coated film was placed in an exposure apparatus, and the oxygen concentration was made 100 ppm or less by introducing nitrogen into the apparatus. Thereafter, the light source with the maximum peak wavelength of 172 nm was used, and the illuminance of the light was 4.0 J. Incidentally, the measurement of the illuminance was conducted using an UV power meter C9536 and a light receiving unit H9535-172 (respectively trade name, manufactured by Hamamatsu Photonics KK).

Evaluation

Using DELTAPERM-UH gas permeation measurement instrument (manufactured by Technolox Ltd.), moisture vapor permeability (WVTR value) was measured at 40° C. in 90% relative humidity atmosphere with respect to a film before coating as well as a film with the film thereon obtained by the above-mentioned method. When a measured value became a constant value, the value was taken as a WVTR value. However, if it did not become a constant value even after 4,000 minutes, it was taken as N/A. Moisture vapor permeability of the film before coating was 1 g/m$^2$/day. Further, using an ellipsometer, the thickness of the obtained film was measured. The film thickness was respectively 200 nm. The obtained results were as shown in Table 1.

TABLE 1

| | additives | | WVTR |
|---|---|---|---|
| | type | addition amount * | value |
| Example 1 | A-1 | 0.180 | $5 \times 10^{-4}$ |
| Example 2 | A-4 | 0.180 | $5 \times 10^{-4}$ |
| Example 3 | A-6 | 0.180 | $1 \times 10^{-3}$ |
| Example 4 | B-1 | 0.060 | $4 \times 10^{-4}$ |
| Example 5 | B-4 | 0.060 | $6 \times 10^{-4}$ |
| Example 6 | B-5 | 0.060 | $5 \times 10^{-4}$ |
| Example 7 | C-1 | 0.015 | $3 \times 10^{-4}$ |
| Example 8 | C-2 | 0.015 | $6 \times 10^{-4}$ |

TABLE 1-continued

| | additives | | WVTR |
|---|---|---|---|
| | type | addition amount * | value |
| Example 9 | D-1 | 0.060 | $4 \times 10^{-4}$ |
| Example 10 | D-1 | 0.120 | $5 \times 10^{-4}$ |
| Example 11 | D-1 | 0.180 | $6 \times 10^{-4}$ |
| Example 12 | D-2 | 0.015 | $7 \times 10^{-4}$ |
| Example 13 | E-1 | 0.015 | $4 \times 10^{-4}$ |
| Example 14 | F-1 | 0.060 | $6 \times 10^{-4}$ |
| Example 15 | G-1 | 0.060 | $4 \times 10^{-4}$ |
| Example 16 | G-2 | 0.060 | $7 \times 10^{-4}$ |
| Example 17 | H-1 | 0.060 | $3 \times 10^{-4}$ |
| Example 18 | H-4 | 0.060 | $9 \times 10^{-4}$ |
| Comparative Example 1 | R-1 | 0.060 | N/A |
| Comparative Example 2 | R-2 | 0.060 | N/A |
| Comparative Example 3 | R-3 | 0.060 | N/A |
| Comparative Example 4 | R-4 | 0.060 | N/A |
| Comparative Example 5 | R-5 | 0.060 | N/A |
| Comparative Example 6 | R-6 | 0.060 | N/A |
| Comparative Example 7 | R-7 | 0.060 | N/A |
| Comparative Example 8 | R-8 | 0.060 | N/A |
| Comparative Example 9 | R-9 | 0.060 | N/A |
| Comparative Example 10 | R-10 | 0.060 | N/A |
| Comparative Example 11 | R-11 | 0.060 | N/A |
| Comparative Example 12 | — | 0.000 | N/A |

In the table, the addition amount of the additive is the amount (mmol) of the additive based on 1 g of the polysilazane.

Further, N/A indicates that the WVTR value did not become a constant value within a certain period of time, and the measurement was impossible.

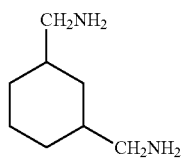

(A-1)

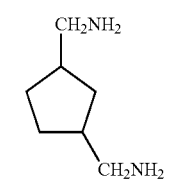

(A-4)

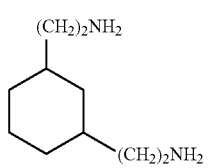

(A-6)

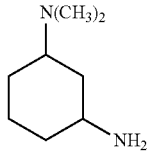

(B-1)

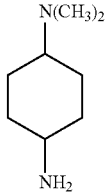

(B-4)

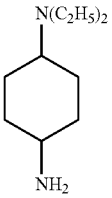

(B-5)

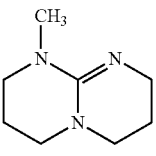

(C-1)

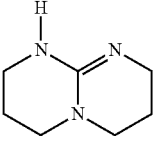

(C-2)

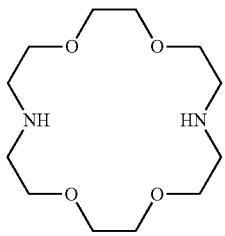

(D-1)

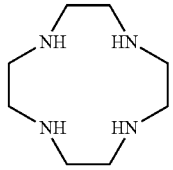

(D-2)

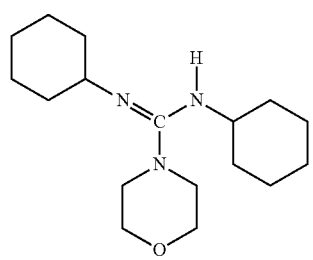

(E-1)

-continued

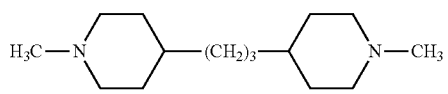
(F-1)

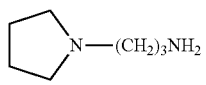
(G-1)

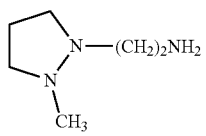
(G-2)

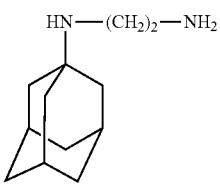
(H-1)

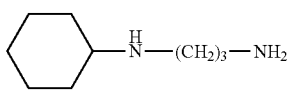
(H-4)

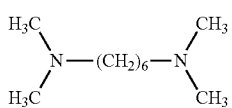
(R-1)

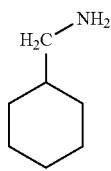
(R-2)

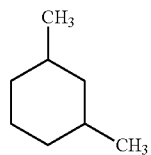
(R-3)

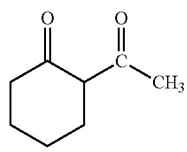
(R-4)

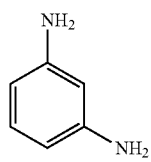
(R-5)

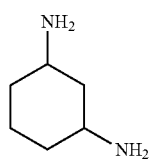
(R-6)

-continued

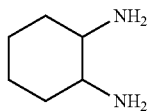
(R-7)

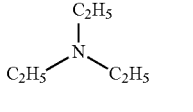
(R-8)

(R-9)

H₃C(H₂C)₇    (CH₂)₈NH₂

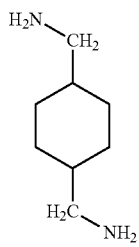
(R-10)

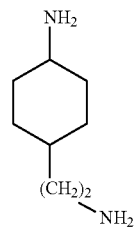
(R-11)

The invention claimed is:
1. A film forming composition comprising:
a polysilazane,
an organic solvent, and
at least one type of additive is the general formula (A):

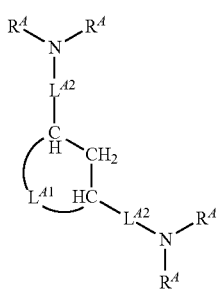
(A)

wherein
$L^{A1}$ is a $C_{1-7}$ alkylene or a $C_{1-7}$ heteroalkylene,
$L^{A2}$s are each independently a $C_{1-7}$ alkylene, and
$R^A$s are each independently hydrogen or a $C_{1-3}$ alkyl.
2. The composition according to claim 1, wherein said $L^{A1}$ is a $C_{2-4}$ alkylene.
3. The composition according to claim 1, wherein said $L^{A2}$s are each independently —$CR^{A'}_2$—, where $R^{A'}$s are each independently hydrogen or a $C_{1-3}$ alkyl.
4. The composition according to claim 1, wherein said $R^A$s are all hydrogen.
5. The composition according to claim 1, wherein said polysilazane comprises a structural unit of the following general formula (1):

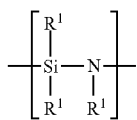

(1)

wherein
R¹s are groups each independently selected from the group consisting of hydrogen, alkyl, alkenyl, cycloalkyl, aryl, alkoxy, amino and silyl, where at least one of R¹ is hydrogen and other R¹ is unsubstituted or substituted by one or more groups selected from the group consisting of halogen, alkyl, alkoxy, amino, silyl and alkylsilyl.

6. The composition according to claim 1, wherein R's are groups each independently selected from the group consisting of hydrogen, alkyl, alkenyl, aryl, alkylsilyl and alkoxysilylalkyl.

7. The composition according to claim 1, containing 0.002 to 0.5 mmol of said additive, based on 1 g of said polysilazane.

8. The composition according to claim 1, further comprising an additional component represented by the following general formula (2):

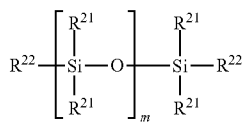

(2)

wherein,
R²¹s are groups each independently selected from the group consisting of hydrogen, alkyl, alkenyl, cycloalkyl, aryl, alkoxy, amino and alkylsilyl, where R²¹ is unsubstituted or substituted by one or more groups selected from the group consisting of halogen, alkyl, alkoxy, amino, silyl and alkylsilyl when R²¹ is other than hydrogen, and the total number of all amino and alkoxy in the formula is 5% or less based on the total number of all R²¹ in the formula, R²²s are each independently a $C_{1-8}$ hydrocarbon group, or —R²³—N—R²⁴₂ wherein R²³ is a $C_{1-5}$ hydrocarbon group and R²⁴s are each independently hydrogen or a $C_{1-3}$ hydrocarbon group, and m is a number indicating polymerization degree.

9. The composition according to claim 1, further comprising an additional component represented by the following general formula (3):

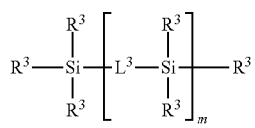

(3)

wherein,
the groups R³ are each independently a monovalent group selected from the group consisting of a hydrogen atom, halogen atom, hydrocarbyl group, hydroxyl group, hydroxyhydrocarbyl group, acyl group, acyloxy group, amine group, aminohydrocarbyl group, hydrocarbyloxy group, silylhydrocarbyl group, imino-containing hydrocarbyl group; or R³ is a single bond that forms a cyclic structure with another silicon atom,
L³ is a single bond, an alicyclic hydrocarbon, an aromatic hydrocarbon, a heterocyclic ring, or a saturated or unsaturated hydrocarbon chain where the chain may be interrupted by one of an oxygen atom, an imide group, an imino group, a carbonyl group, or a carboxyl group, and
m is a number of zero or more, indicating polymerization degree.

10. The composition according to claim 1, wherein said organic solvent comprises one or more kind of solvent which is aromatic hydrocarbon, saturated hydrocarbon compound, alicyclic hydrocarbon compound or alkyl ether.

11. A film forming method, comprising:
(1) coating step of applying the composition according to claim 1 on a substrate to form a composition layer, and
(2) exposure step of exposing said composition layer to light.

12. The method according to claim 11, wherein said substrate is a plastic film.

13. The method according to claim 11, wherein the thickness of said composition layer is 10 to 900 nm.

14. The method according to claim 11, wherein the wavelength of the light is 161 to 248 nm.

15. The method according claim 11, wherein said exposure step is carried out under inert gas atmosphere.

16. A film produced by the method according to claim 11.

17. An electronic device, a medical device, a packaging container or a wrapping paper, which comprise the film according to claim 16.

* * * * *